United States Patent [19]

Coronel

[11] Patent Number: 4,700,589
[45] Date of Patent: Oct. 20, 1987

[54] CORONEL RADIANT DRIVE SYSTEMS

[76] Inventor: Paul K. Coronel, 75-380 Aloha Kona Dr., Kailua-Kona, Hi. 96740

[21] Appl. No.: 830,505

[22] Filed: Feb. 14, 1986

[51] Int. Cl.$^4$ .......................... F16H 37/06; F16H 1/40
[52] U.S. Cl. ...................................... 74/705; 74/681; 74/713; 180/6.2
[58] Field of Search ................ 74/793, 695, 705, 681, 74/713; 180/6.2

[56] References Cited

U.S. PATENT DOCUMENTS

| | | | |
|---|---|---|---|
| 1,270,480 | 6/1918 | McCloskey | 180/6.2 X |
| 1,519,494 | 12/1924 | Kent | 74/713 X |
| 2,353,554 | 7/1944 | Gates | 74/713 X |
| 2,611,442 | 9/1952 | Thomas | 180/6.2 |
| 2,734,397 | 2/1956 | Bade | 74/705 X |
| 2,772,580 | 12/1956 | Miura et al. | 74/705 X |
| 2,780,299 | 2/1957 | Matson | 74/713 X |
| 2,845,818 | 8/1958 | Siljander | 180/6.2 X |
| 3,316,992 | 5/1967 | Schindler | 180/6.2 |
| 4,497,218 | 2/1985 | Zamberger | 180/6.2 X |
| 4,532,828 | 8/1985 | LaGuardia | 74/681 X |

FOREIGN PATENT DOCUMENTS

| | | | |
|---|---|---|---|
| 1450886 | 5/1969 | Fed. Rep. of Germany | 74/681 |
| 3560 | 2/1897 | United Kingdom | 74/713 |
| 201921 | 5/1924 | United Kingdom | 74/713 |
| 473677 | 1/1936 | United Kingdom | 74/681 |

Primary Examiner—Leslie Braun
Assistant Examiner—Dirk Wright

[57] ABSTRACT

The disclosure discribes an all-gear transmission which recirculates and compounds rotary motion and which results in shift-free progressively accelerated output from a limited RPM input range. A variation of the transmission provides a friction-free all-gear continuously engaged mechanical clutch for use in tandem with the transmission to provide a friction-free stepless all-gear uninterrupted drive arrangement. Also disclosed is an improved steering driver for tracked vehicles utilizing a auxiliary steering motor and one primary axle axis of rotation.

10 Claims, 13 Drawing Figures

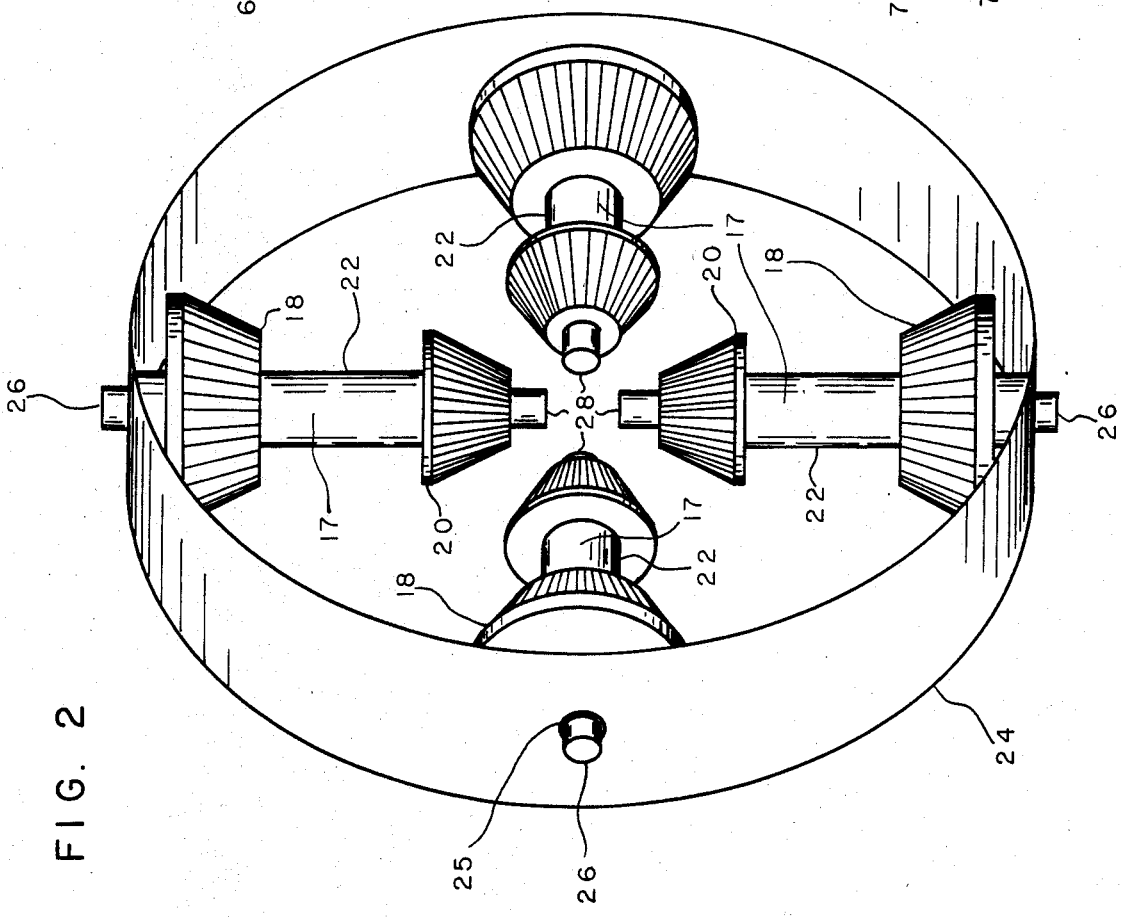

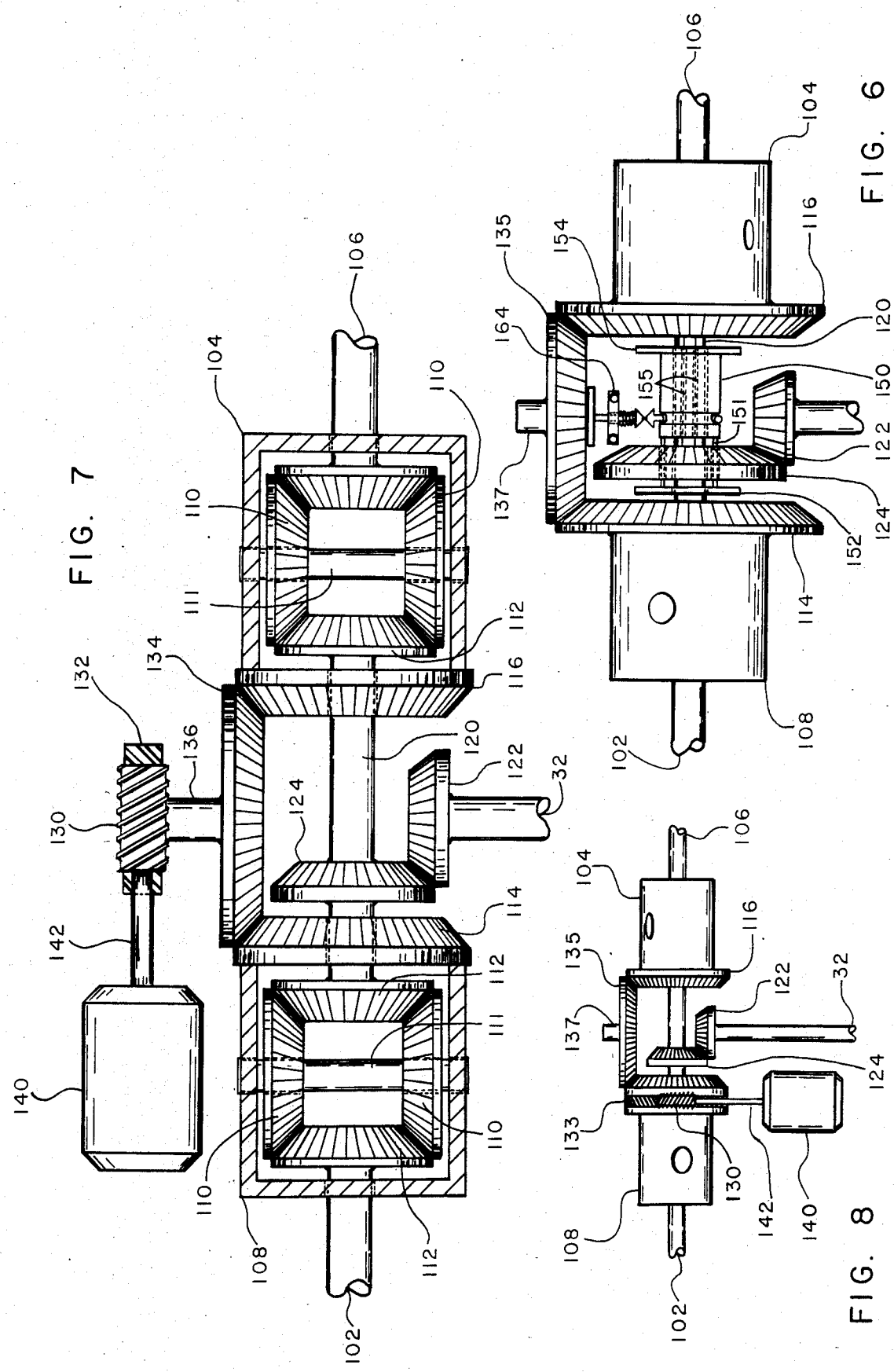

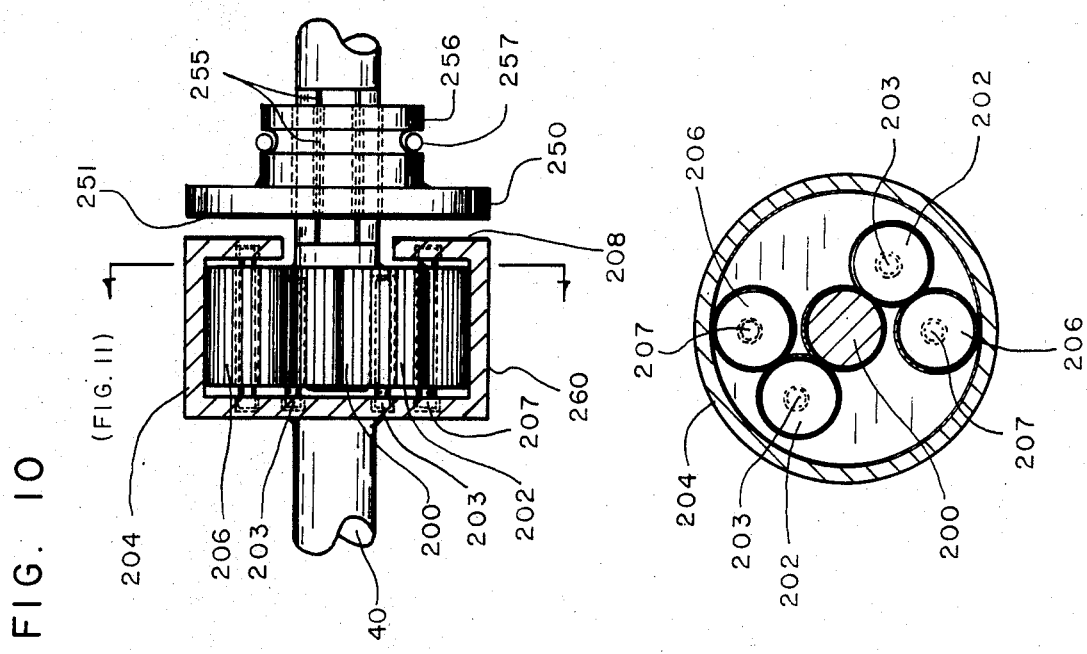
FIG. 10
FIG. 11
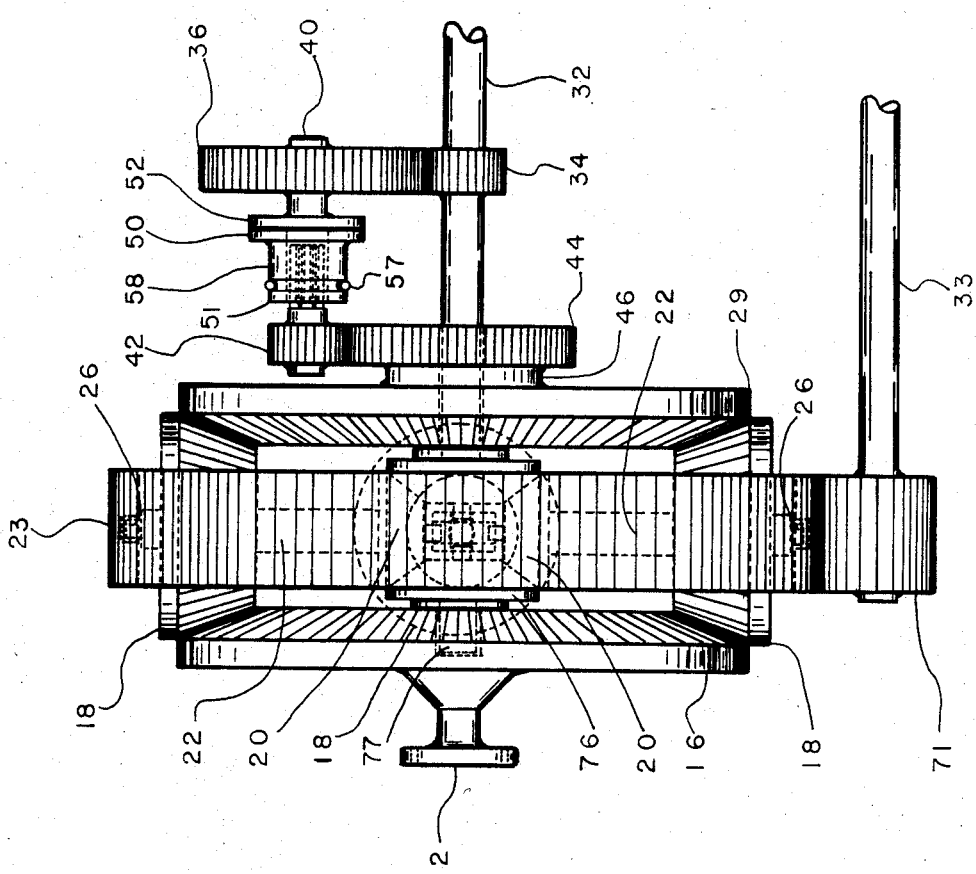
FIG. 9

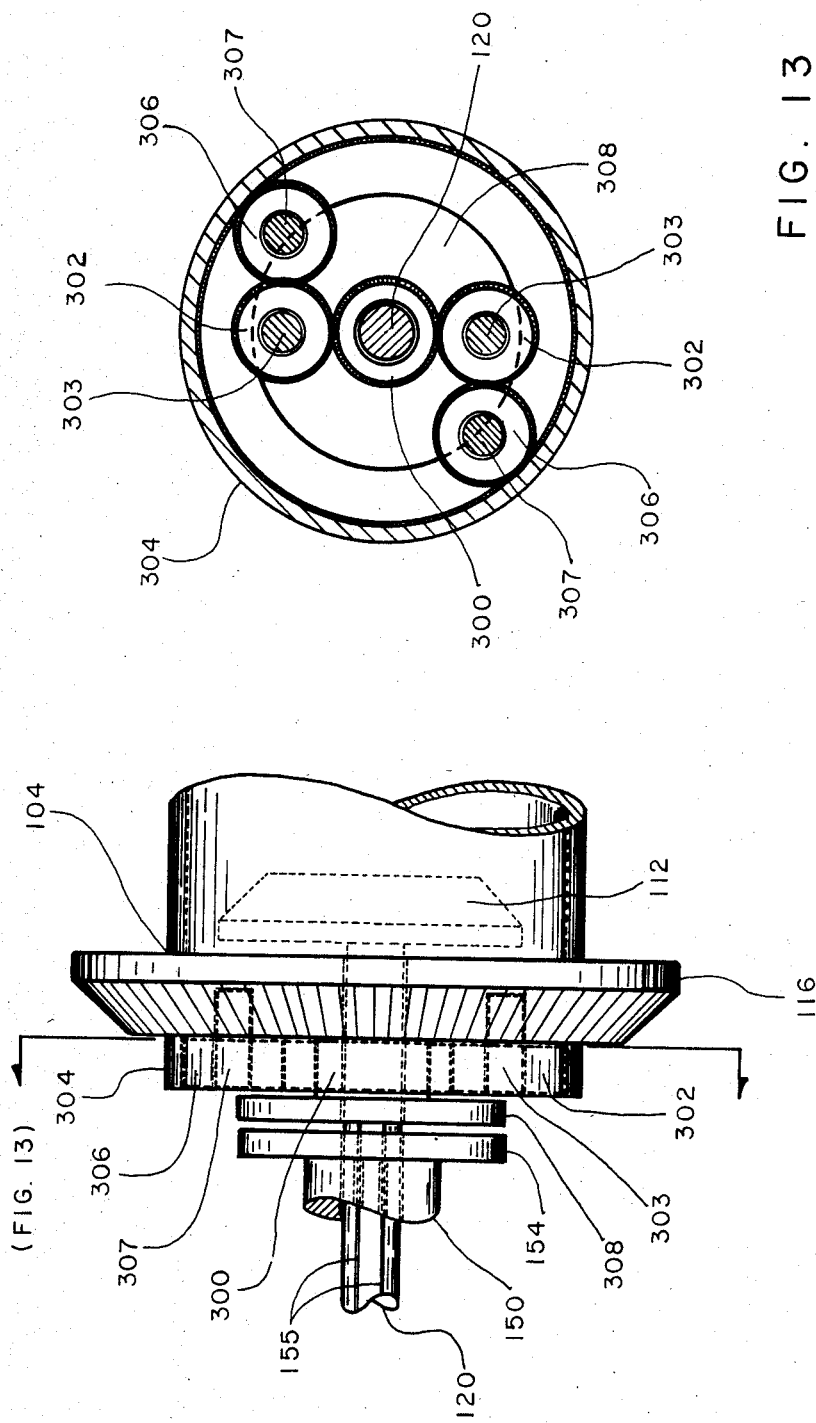

CORONEL RADIANT DRIVE SYSTEMS

BRIEF SUMMARY OF THE DISCLOSURE

The disclosure describes various geared mechanisms designed to regulate and manipulate rotary propulsive power for machines and vehicles.

The transmission disclosed in a kinematic mechanism consisting of a double epicyclic gear train with accessory gears. During operation of the transmission, this double epicyclic train takes rotary motion input into the transmission and divides it into two different stages. The first stage multipliers produce a simple product. This product is mechanically combined with the product of the second-stage gear train by the bidirectionally driven, double epicyclic couplers. The resulting sum is used both for transmission output and for the second-stage input rate. A recirculating compounding of rotary motion produces a progressively accelerating output rate allowing the transmission to propel vehicles or machines throughout their entire operational speed range during both forward and reverse operation.

The primary objective of this invention is to provide an all-gear, shift-free transmission to propel a vehicle or machine throughout its full operational range. Additional objectives are: (1) to provide a transmission free from internal clutch or band friction and from any gear damage resulting from improper shifting, (2) to provide a continuous drive transmission with fewer parts, (3) to provide a transmission which eliminates shifting torque loss during operation, and (4) to provide a transmission which will allow vehicle or machine operation with small engines utilizing narrow operating ranges of maximum power output, allowing these engines to further function as resistive brakes during deacceleration throughout the entire speed cycle.

The disclosure further describes a frictionless clutch mechanism which is a variation of the transmission mechanism. This frictionless clutch performs conventional clutching type functions as a result of planetary travel by the double epicyclic receiving gears when they combine or sum progressively different products of the two multiplier stages. The frictionless clutch can be used in tandem with one or more transmissions to propel vehicles or machines throughout their entire operational speed range.

The principal objectives of this invention are to provide: (1) an all-geared mechanism which performs clutching type functions which will not suffer wear from clutch disc, or clutch band friction, (2) to provide a mechanical clutch which will not produce engine torque loss during actuation of the clutching function, (3) to provide a clutching mechanism which will prevent vehicular or machine drive uncoupling during actuation of the clutching function.

The disclosure finally describes an improved steering driver for tracked vehicles which utilize (1) a clutched planetary reduction drive, or (2) an axillary motor source to vary rotary motion of two separate driving differentials attached to a single discontinuous driveshaft. The two differentials are located on opposite sides of the primary driving gears and are connected by a common steering drive gear. During operation of the first alternative, vehicular motor power drives a planetary reduction drive to counterrotate both differential housings interconnected with the steering drive gear. During operation of the second alternative, the secondary motor rotates either the steering drive gear or a ring gear which causes both differential housings to counterrotate, thus producing a differential drive rate for the final drive shafts and resulting in vehicular turning.

The principal objectives of this invention are to provide: (1) a means of steering a tracked vehicle without uncoupling and/or dissipating a portion of the vehicular driving torque during vehicle turning, (2) a means of turning a high-speed tracked vehicle without utilizing two separate drive motors and transmissions to vary track speeds, (3) a very precise method of controlling the tracked vehicular turning rate utilizing a single discontinuous driveshaft.

As various modifications might be made in the inventions set forth herein, it is to be understood that all matter herein described or shown in the accompanying drawings is to be interpreted as illustrative and not limiting.

BRIEF DESCRIPTION OF THE DRAWINGS

FIG. 2 is a perspective view of the Radiant Driver assembly of the transmission.

FIG. 3 is a perspective view of the hub bearing block for the Radiant Drive assembly of the transmission.

FIG. 4 is a top view of the low speed clutch and lock assembly for the regulating portion of the transmission.

FIG. 5 is a top view of an alternative arrangement for driving the regulator section of the transmission.

FIG. 6 is a top view of the arrangement of key components of the steering-driver for tracked vehicles similar to that contained in FIG. 1, but with the tracked vehicle traveling in a straight line.

FIG. 7 is a steering driver for tracked vehicles utilizing an auxiliary motor to vary the track speeds.

FIG. 8 is a steering driver for tracked vehicles similar to that contained within FIG. 7, but showing an alternative arrangement for positioning and operating the auxiliary motor.

FIG. 9 is a top view of an all gear, automatic clutch capable of driving a vehicle or machine.

FIG. 10 is a side view of a constant motion planetary gear reduction mechanism.

FIG. 11 is a cross-sectional view of the constant motion planetary gears, and driven planetary gear housing.

FIG. 12 is a side view of a planetary gear reduction drive for the steering driver mechanism.

FIG. 13 is a cross sectional view of the gears, and driven gear housing arrangement for the planetary gear reduction drive for the steering driver mechanism.

DETAILED DESCRIPTION OF THE TRANSMISSION

Figure 1:
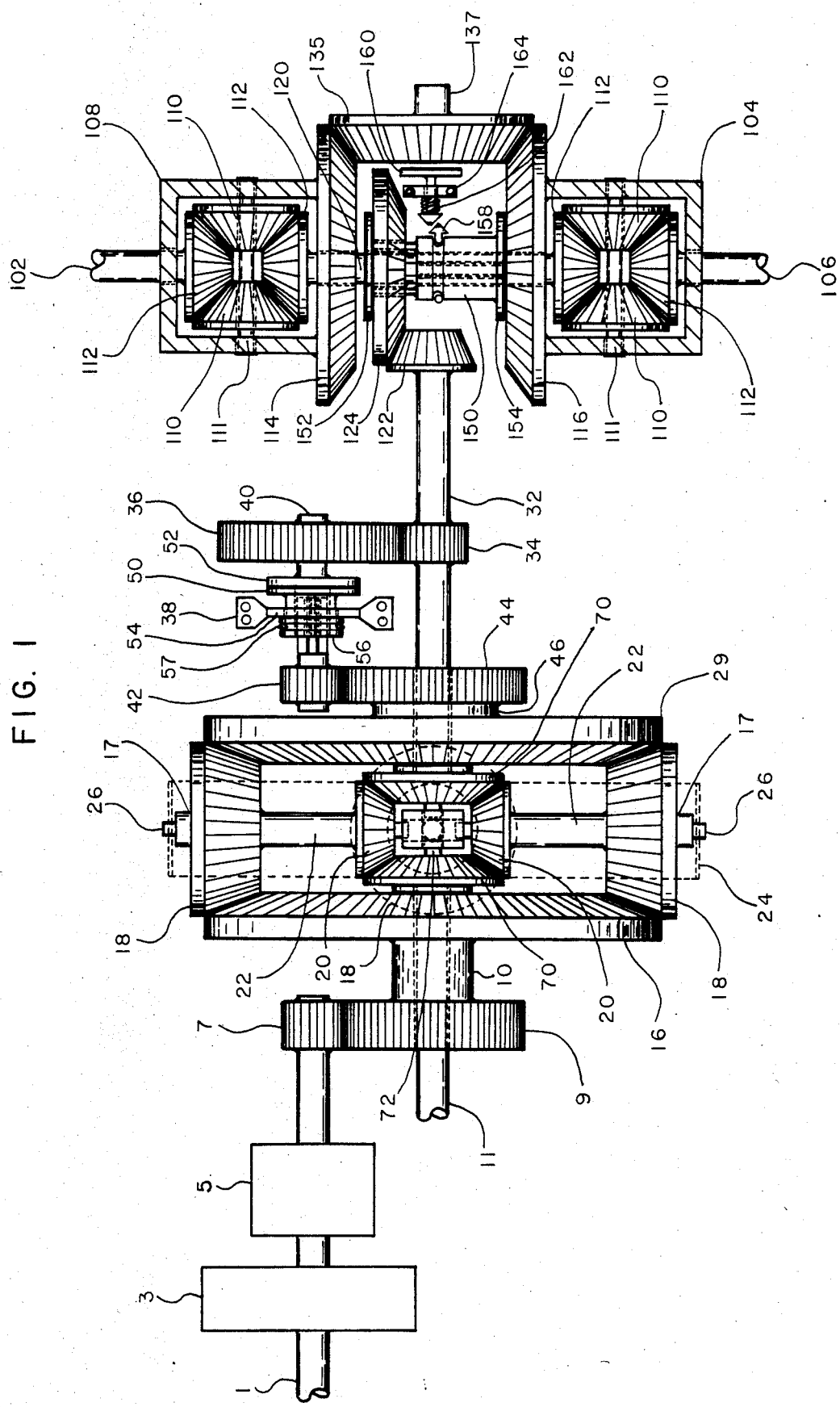
FIG. 1 is a top view arrangement of the key components of the Radiant Drive transmission coupled to the improved steering-driver for tracked vehicles. This and other drawings show only the working components and not mounting and supporting structures.

During operation, motor power is provided to the transmission by rotating drive shaft 1 of FIG. 1. A clutch attached to the motor, not shown but generally indicated at 3, separates the transmission when the motor type requires an idle speed to prevent the engine from stopping when the vehicle is not moving. Clutch 3 may be of the frictionless type later described in this disclosure, a friction disc type or a hydraulic torque converter.

The reverse gear assembly, also not shown but generally indicated at 5, is utilized when the vehicle is to be powered in a reverse direction without reversing the motor-output direction.

During operation, the transmission gear driver 7 and reduction gear receiver 9 are cog wheels which mesh with each other to step down or slow motor input rotation and increase drive torque during transmission operation. Such reduction accommodates slower moving heavy vehicles such as tractors and tracked vehicles. In applications where increased drive torque provided by the step down is unnecessary, the ungeared direct engine coupling 2 of FIG. 9 is utilized to drive light weight vehicles, aviation or marine propellers, high speed generators, or other similar applications.

Motor input revolves engine tributary 16 of FIG. 1 through attached coupling 10. Engine tributary 16 is a crown gear plate, or bevel gear wheel which meshes with four receiving gears 18. The four receiving gears 18 are mounted to create an axis cruciform satellite orbit where the satellites rotate in harmony about their crossed individual axis of rotation; they are further capable of concurrently orbiting as a unit about their common cruciform axis. During transmission operation, the driving of receiving gears 18 by tributary 16 produces a simple rotational product comprising the first of two rotary multiplication-product-producing stages which increase or expand the rotary motion input. In this first stage, engine tributary 16 is the multiplier and receiving gears 18 are the multiplicands, rotating at a rate determined by the present gear ratio. In the second stage discussed later, regulatory tributary 29 is a second-crown gear plate, or bevel gear wheel, which also meshes with the same four receiving gears 18 but is located on the opposite side of receiving gears 18, as in FIG. 1. The receiving gears 18 function as a common multiplicand when bidirectionally driven by both engine tributary 16 and regulator tributary 29 concurrently.

Attached to receiving gears 18 are transmitting shafts 22 which point inward towards the cruciform axis. Attached to inner end of transmitting shafts 22 are beveled drive transmitting pinion gears 20. Gears 18, shafts 22, and gears 20 are joined to create united couplers 17. Each coupler 17 has outer bearing shaft 26 attached to its outer end, and inner bearing shaft 28 attached to the interior ends which allow the entire couplers to rotate as units at the same speed. While this disclosure shows four couplers 17, the transmission will operate with from one to more than four couplers 17.

The purpose of the couplers 17 are to transfer the combined product of both the first and second stages of multiplication products through the transmitting gears 20 to the output receiving gears 70. Both the transmitting gears 20 and the transmission output receiving gears 70 are bevel gears which mesh with one another to transfer rotating power through drive shaft 32, both as (1) the transmission output and as (2) the input rate for the second stage multiplicative gear train.

The outer bearing shafts 26 of couplers 17 rotate within sustaining ring bearing races 25, located within sustaining ring 24 of FIGS. 1 and 2. The purpose of sustaining ring 24 is to provide correct spacing and structural support for couplers 17 to rotate (1) freely upon their individual axis of rotation and (2) as a unit around the cruciform axis to transfer the combined product of the first and second multiplicative stages to output receiving gears 70 and drive shaft 32.

Since sustaining ring 24 is not attached to any objects but couplers 17, it is free to rotate around its own central axis when driven differentially by the two tributaries 16 and 29. During such rotation, the couplers 17 now rotate as satellites about a common central axis shared with sustaining ring 24. Such differentially-driven ring rotation prevents gear lockup when couplers 17 automatically and concurrently combine the simple products of both the first and second stages of rotary multiplication to produce their sum; the rate of the sum being utilized (1) as the transmission output and (2) as the input rate for the second-stage multiplicative gears. Differentially-driven ring rotation enhances output rotation by concurrently driving output receiving gear 70 through couplers 17. This ring rotational action is utilized as an operation principle for the frictionless clutch discussed later in this disclosure. Ring 24 and couplers 17 combine to form the radiant driver assembly of FIG. 2.

The inner bearing shafts 28 of couplers 17 rotate within shaft inner bearing races 62 of hub bearing block 60 of FIG. 3. Hub bearing block 60 also contains bearing races 74 for transmission output receiving gear inner bearing shafts 72, as shown in FIGS. 1 and 5. During operation, hub bearing block 60 provides structural support as well as inner-shaft bearing surfaces for couplers 17 and output receiving gears 70. The hub bearing block 60 is free to rotate with the sustaining ring 24 when driven by couplers 17 during ring rotation.

During transmission operation, the four coupler transmitting gears 20 do not contact each other, but all four mesh with and drive the two transmission output receiving gears 70. These counterrotate with one another at different speeds during rotation of the radiant driver assemble of FIG. 2.

Attached to drive shaft 32 is reduction gear driver 34, which meshes with, and drives, reduction gear receiver 36. Reduction gear receiver 36 is attached to shaft 40. Also attached to shaft 40 is low gear clutch and lock 38, and regulator tributary drive gear 42. Low gear clutch and lock 38 is attached to the transmission housing in a manner which allows the clutch to retain its position within the transmission housing while rotatively unlocking and manipulating shaft 40 rotational rates. Regulator tributary drive gear 42 meshes with and rotates tributary receiving gear 44. Regulator tributary receiving gear 44, coupler 46, and regulator tributary 26 are attached to each other and rotate together as one unit, with shaft 32 freely rotating through their center. During transmission operation, the resulting gear ratio of the gear train, consisting of gearing 20, 70, 34, 36, 42, 44, and 29, combine to create the multiplier for the second stage rotary multiplication. The multiplicand of this second stage multiplier is again receiving gears 18, which combines this second-stage product with that of the first stage to produce their sum. This disclosure does not attempt to establish any specific gear ratios. Such ratios may vary according to the application of the transmission.

During initial or slow speed transmission operation, engine input produces low multiplication factors from the second stage. Increases in the transmission input rate will increase (1) the multiplication compounding factor of the second stage and (2) the combined sum of both stages, accelerating the transmission output. Compounding is defined as the looping or recirculation of the accelerating sums to produce greater sums and concurrent transmission output. Continued input acceleration progressively increases these results.

A vehicle or machine propelled by this transmission will experience smooth, continuous acceleration between the initial and maximum operating speeds as well as smooth deacceleration utilizing the motor resistance for a continuous brakeing force. Thus, this transmission continuously and automatically amplifies motor input with an all-gear rotary multiplying or expanding mechanism. This transmission contains fewer parts than do transmissions now in use, and it is designed to replace both manual and conventional automatic shifting transmissions, both of which require separations between gear ratio shifts, resulting in temporary loss of drive/torque continuity. This transmission will further require reduced maintainance since no internal clutches or bands will wear, nor will gear damage occur from missed shifts.

With the establishment of suitable gear ratios, this transmission can be designed to deliver appropriate output for the total vehicular or machine operating range with the drive motor RPM range preset within a narrowed operating range of maximum power output.

Drive shaft 11 is utilized for accessory power or related applications. Ring 24 of FIG. 1 may also be utilized as an accessory drive when rotating with the installation of gear teeth or cogs upon the outer circumference to create a ring driver similar to driver 23 of FIG. 9. During this application, ring driver 23 will mesh and rotate output receiving gear 71 and drive shaft 33. In a situation where the drive motor and engine tributary 16 are completely stopped, exterior drive shaft 33 can be utilized for axillary power input. In this application, axillary power would rotate driver 23 and couplers 17, which would rotate drive shaft 32 for transmission output when clutch assembly 51 of FIG. 9 is opened to permit the freewheeling of tributary 29. The advantage of this arrangement is to allow an accessory, such as a generator/motor, to propel the vehicle.

FIG. 5 shows an alternative method of creating the second stage multiplier. In this alternative, the second stage multiplier originates from the resulting gear ratio of the gear train, consisting of differential 90 of FIG. 5, transmitting gear 98, gear 96, tributary drive gear 42, and receiving gear 44.

Located upon shaft 40 of FIGS. 1 and 4 is the low gear clutch and lock 38. This unit consists of sliding clutch/lock actuator 56, capable of lateral movement when motivated by clutch actuating fork 57. Sliding actuator 56 is rotated by splines 55 of FIG. 4 which protude from shaft 40 and key into lateral grooves located on the interior walls of sliding actuator 56. Attached to the right end of sliding actuator 56 is clutch plate 50 which contains friction clutch facings on both side surfaces. The purpose of clutch/lock actuator 38 is to interrupt the rotary multiplying ability of tributary 29 by locking it into a fixed, non-rotating position, a position which effectively locks the second-stage multiplier and cancels the ability of couplers 17 of FIGS. 1 and 2 to combine the product of the first and second stages, leaving only the product of the first stage as transmission output.

During operation of low gear clutch/lock 38, clutch actuating fork 57 moves sliding clutch/lock actuator 56 to the left. Thus the pressure exerted by clutch actuating fork 57 to maintain contact between the right side facing of clutch plate 50 and clutch drive plate 52, attached to the end of the right section of shaft 40, is released, breaking the driving relationship between both separate sections of shaft 40.

The movement of sliding clutch/lock actuator 56 to the left continues until the left side facing of clutch 50 contacts and maintains pressure with immobile clutch lock plate 54. This locking action immobilizes the movement of tributary 29, terminating second-stage output. The advantage of this arrangement is that it generates a low-revolution speed with a high-torque transmission output, giving the vehicle advantages similar to the low gear function of a standard transmission.

An alternative method of selectively reducing the second-stage multiplier is to substitute low gear clutch/lock 38 of FIG. 1 with planetary reduction clutch 260, shown in FIGS. 10 and 11. The advantage of the low gear clutch/lock is to give the transmission the stepdown performance of a conventional lower gear with an increase of engine revolutions. These reduced second-stage multiplications increase transmission-output torque, giving the transmission the performance advantage of a conventional passing gear at any vehicular speed.

DETAILED DESCRIPTION OF THE FRICTIONLESS CLUTCH

The frictionless clutch is a variation of the transmission which also performs substantially different roles. These roles include; (1) the replacement of the conventional friction disc load severing/disengaging coupler and (2) the use of this continuously engaged, all-geared mechanism to provide an engaged zero output at motor idle speed with a progressive accelerating output at increased motor speeds.

The use of the work "frictionless" implies the ability of the mechanism to perform the traditional clutch role of motivating a machine drive or vehicle from a stopped to a moving status, and back to the stopped position, without impeding the ability of the engine to idle without load, and without generating friction. The term "frictionless" as utilized in this disclosure does not imply that there will be no normal friction from gear meshing or bearing resistance.

The frictionless clutch drive operates in a manner similar to that of the transmission by utilizing the double epicyclic gear train to divide rotary motion into two stages obtaining differential products from each stage and resulting in the rotation of the driving-coupler sustaining-ring at various rates during the operational cycle. The operation of the frictionless clutch differs from that of the transmission in that the output power source originates from the rotation of sustaining ring 24 of the transmission, not from the rotation of driveshaft 32.

During operation, motor input rotates engine tributary 16 of FIG. 9 to operate the double epicyclic train as in the transmission. Sustaining ring driver 23 contains gear teeth which mesh with and rotate ring driver output receiving gear 71 when the ring driver is rotated by differential tributary driving rates. Gear 71 is attached to alternate drive shaft 33, which is mounted through the mechanism housing in a manner which allows it to rotate and provide the frictionless clutch driving output; thus clutch output is progressively and smoothly transmitted through rotating drive shaft 33 when motor input exceeds idle speeds. At motor idle speeds, the two multiplier stages output identically, preventing ring 24 from rotating and bringing the vehicle or machine to a stopped position without disengaging the vehicular or machine drive train, thus effectively locking the vehicle or machine in the stopped position. The advantages of this arrangement include durable fully-automatic clutching along with the elimination of the need of "feel" clutch engagment moment to facilitate smooth clutch actuation, the elimination of the limited life of mechanical clutch facings, and the elimination of the power-loss and heat-dissipation problems of both friction-disc clutches and fluid torque converters.

DETAILED DESCRIPTION OF THE STEERING DRIVER

Also shown in FIG. 1, coupled with drive shaft 32, is the steering driver mechanism for vehicles, including endless belt tracklayers. A traditional method utilized to drive these vehicles was to input rotary motion into the drive axle to rotate two wheels. These in turn meshed with and rotated the endles belt tracks. Steering was accomplished by uncoupling one track driving wheel and allowing friction and/or mechanical brakes to slow the rate of rotation of the track relative to the rate of rotation of the second track. This differential track speed pivoted the vehicle about the slower track. This traditional method required frequent maintainance and replacement of the direct-driving steering-couplers or clutches possessing a limited life. Operational efficiency of this method was limited to vehicles possessing relatively slow speeds. High speed tracked vehicles utilizing clutch/brake steering methods are incapable of precise, safe and predictable directional changes.

Attempts to resolve high speed precise steering problems led to the installation of twin engines coupled to twin automatic transmissions. These vehicles turned by varying one track drive to reduce engine and transmission output during turning. While being a complicated, but attractive solution, inability to match identically performing engines and transmissions and to precisely vary as necessary drive train output proved unreliable in practice.

While the primary purpose of this disclosure is to describe improvements in tracked vehicle driving and steering methods, another purpose of the disclosure is to describe improvements in steering driver systems for tracked vehicles which utilize one discontinuous drive axle of rotation.

The first improvement utilizes vehicular drive input to power clutched planetary reduction drives to vary rotary motion and create a differential final output drive rate. The second improvement contains two alternative arrangements which utilize an axillary motor to vary rotary motion to create a differential final output drive.

During operation of the first improvement, the vehicular engine-powered steering driver of FIG. 1 accepts rotating motor drive input from driving pinion 122 and rotating driving gear 124, attached to driver axle shaft 120. Axle shaft 120 passes through, but does not rotate, left ring gear 114 and right ring gear 116. The left end of axle shaft 120 is attached to differential inner side gear 112, and the right side of axle shaft 120 is also attached to right inner side gear 112. During all vehicular driving and turning, both inner side gears 112 rotate together at the same rotational rate of drive axle 120 and driving gear 124. During non-turning straight vehicular movement, both spider gears 110, located within left track steering driver differential 108, mesh with and are counterrotated by left side gear 112; this, in turn, meshes with and rotates left side outer side gear 112 and attached left track drive shaft 102, which then passes through the left differential 108 outer wall to rotate and drive the vehicular left side drive wheel and endless track.

The right track is concurrently and similarly driven when axle 120 rotates right side differential side gear 112, attached to right track drive shaft 106, which passes through right differential 104 outer wall to rotate and drive the vehicular right drive wheel and endless track. During normal vehicular operation, left track drive shaft 102 and right track drive shaft 106 rotate in a direction opposite to that of driver axle shaft 120.

Located upon axle shaft 120 is the sliding steering clutch actuating drum 150. Drum 150 contains a passage within to permit (1) axle shaft 120 to pass through it; and (2) key splines attached to axle shaft 120 to pass through grooves cut into the axle shaft passage, thus allowing clutch actuating drum 150 to rotate with, and at the same speed as, axle shaft 120.

Attached directly to the right end of drum 150 is right steering clutch disc 154. Steering clutch disc 154 is firmly attached to drum 150 in a manner which will permit it to transfer the rotational torque and motion created by the vehicle drive engine to right ring gear 116 as well as to the ring gear planetary reduction drive shown in FIGS. 12 and 13.

Attached to the left side of drum 150 are clutch/drum connecting rods 151 of FIG. 6, which slide through driving gear 124 and are firmly connected to left steering clutch disc 152. Connecting rods 151 and attached left steering clutch disc 152 freely move laterally during actuation of the steering clutch actuation drum by steering clutch/brake lock actuator fork 158 during vehicular operation.

Vehicle turning is accomplished when steering clutch/brake lock actuator fork 158 exerts pressure to slide steering clutch actuator 150 and right steering clutch 154, or left steering clutch 152, toward pressure contact with the appropriate right or left planetary steering reduction clutch of FIGS. 12 and 13.

Clutch disc contact with planetary steering reduction gear rotates the ring gear in the already-established direction but at a reduced rate. During movement of the actuator fork 158, withdrawn pressure tip contact frees spring 162, retracting steering lock brake 160 from steering transfer gear 135 and freeing gear 135 to rotate upon shaft 137.

Steering transfer gear 135, left ring gear 114, and right ring gear 116 are beveled gears which mesh with each other when any rotation of either ring gear results in corresponding counterrotation of the other ring gear. The differential housings which support spider gear shafts 111 and attached spider gears 110 are attached to and counterrotate with ring gears 114 and 116 during steering system actuation. Counterrotation of the differentials concurrently with vehicular driving results in increasing the rotation rate of one drive shaft while concurrently reducing the rotating rate of the other drive shaft. This differential rotating rate results in differential track speeds, pivoting the vehicle with power from the primary driving engine.

Upon completion of vehicular turning, drum 150 returns to its centered position of FIG. 6, releasing clutch disc 152 or 154 from its propelling contact and reactuating steering lock brake 160 to restrain steering drive gear 134 from rotating.

During actuation of the planetary reduction drive of FIGS. 12 and 13, planetary driver disc 308 and attached planetary driver gear 300 rotate freely as one unit around driver axle shaft 120. Planetary drive gear 300 contains gear teeth or cogs upon its outer circumference which mesh with and rotate both idler gears 302. Idler gears 302 mesh with and rotate ring driving gears 306. Both idler gears 302 and both ring driving gears 306 pivot upon axle shafts 303 and 307 attached to each ring gear 114 and 116. Rotary motion from ring driving gears 306 meshes with and rotates planetary driven ring 304, attached to the ring gear, and rotates it more slowly than planetary driver disc 308. The advantages of this planetary steering reduction clutch are to: (1) reduce the turning rate of the vehicle, expecially at higher speeds and (2) reduce wear upon steering clutches 152 and 154.

Shown in FIG. 7 is the second disclosed tracked vehicle driving and steering method. In the first arrangement of this alternative, steering motor 140 is operated with electricity, hydraulic fluid, compressed gas, or other propulsion, and is reversible in direction. During operation, motor 140 turns worm gear 130, rotating worm wheel 132 and attached steering drive gear 134, thus counterrotating ring gears 114, 116, and the attached mechanism to produce differential vehicle-turning output.

Shown in FIG. 8 is an alternative arrangement for coupling drive motor 140 to the steering mechanism. In this alternative, drive motor 140 rotates steering motor shaft 142 attached to worm gear 130. Worm gear 130 drives combined worm drive and steering drive gear 133 to rotate steering transfer gear 135, counterrotate right ring gear 116, and actuate the steering mechanism to produce differential drive output.

The advantages of operating the steering mechanism with an independently powered driving motor 140 is that the motor produces variable rotary motion independently of the vehicular driving engine. The motor 140 is selectively throttlable, allowing precise variation in vehicle turning.

I claim:

1. An all gear rotary motion transmission comprising:
   (a) an initial crown plate which rotates about a central axis and has a central bore;
   (b) at least one unitary coupler, each coupler including:
      (i) a satellite pinion with which the initial crown plate is connected in driving relation to produce a first stage rotary multiplication product;
      (ii) a beveled pinion transmitting gear; and
      (iii) a connecting shaft which at one end is rigidly connected to the satellite pinion and at another end is rigidly connected to the beveled pinion transmitting gear so that the coupler transmits the first stage rotary multiplication product;
   (c) two output receiving gears with which all the beveled pinion transmitting gears are connected in driving relation, both output receiving gears rotating about the central axis;
   (d) a circular retaining ring including equidistantly spaced bearing supports for the couplers, the satellite pinion of each coupler being rotatably connected to the ring through a bearing support;
   (e) a central bearing block to which the beveled pinion transmitting gear of each coupler is rotatably mounted, and to which the two output receiving gears are rotatably mounted, wherein each coupler can rotate about an axis of its own, and the circular retaining ring, couplers and central bearing block are free to orbit concurrently about the central axis;
   (f) a secondary crown plate having a central bore, the secondary crown plate being rotatable around the central axis and being connected in a driving relation to the satellite pinions in mirror image relation to the initial crown plate;
   (g) a first cog wheel integrally connected to the secondary crown plate to rotate around the central axis, the first cog wheel having a central bore which is contiguous with the secondary crown plate bore;
   (h) a first shaft which is rigidly connected to the output receiving gear which is adjacent to the initial crown plate, the first shaft extending through and beyond the central bore of the initial crown plate such that the initial crown plate is free to rotate around the first shaft;
   (i) a second shaft which is rigidly connected to the output receiving gear which is adjacent to the secondary crown plate, the second shaft extending through and beyond the contiguous central bores of the secondary crown plate and first cog wheel such that the secondary crown plate and first cog wheel are free to rotate around the second shaft;
   (j) a second cog wheel which is rigidly connected to the second shaft to rotate around the central axis;
   (k) a third cog wheel which is connected in driving relation with the second cog wheel;
   (l) a fourth cog wheel which is connected in driving relation with the first cog wheel; and
   (m) a connecting axle which extends between the third and fourth cog wheels and which has ends which are rigidly connected to the third and fourth cog wheels, the connecting axle being parallel to the central axis and supportively mounted to a supporting framework; wherein the beveled pinion transmitting gears transmit to the output receiving gears a rotation output rate determined by the first stage rotary multiplication product, and the output receiving gear adjacent the secondary crown plate producing through the second shaft, the second and third cog wheels, the connecting axle, and the fourth and first cog wheels a second stage rotary multiplication product which establishes the rate of rotation of the secondary crown plate which in addition to the initial crown plate, drives the couplers through their satellite pinions.

2. The transmission as claimed in claim 1 further comprising a sliding clutch and locking mechanism mounted upon the connecting axle between the third and fourth cog wheels, including:
   (a) a clutch plate with friction pad surfaces on both plate sides;
   (b) a centrally bored locking plate rigidly attached to supporting framework;
   (c) a centrally bored actuating drum rotating through the locking plate and keyed to one of two separated connected axle sections to rotate with the axle section, the drum rigidly attached to the clutch plate, the drum and plate laterally moving upon the axle section when actuated by a clutch actuating fork sliding within the rotating circular driving groove about the outer drum wall;
   (d) a clutch driven plate rigidly attached to the second axle shaft section; wherein a equal driving relationship between both axle shaft sections is maintained with clutch plate and driven plate contact, and clutch plate and shaft rotation is prevented with contact between the locking plate and second clutch plate surface, and free rotation of the clutch plate and secondary crown plate and connecting mechanism occurs when clutch plate maintains no contact with the locking plate or driven plate.

3. A transmission as claimed in claim 1 further comprising a means for a selectively actuated planetary geared rotation reduction mechanism attached to the connecting axle; wherein a reduction of the secondary crown plate rotation rate, and a reduction of second stage multiplication occurs to increase transmission output torque producing step-down or passing-gear affect.

4. A transmission as claimed in claim 1 further comprising a rotary reduction system including:
   (a) a rotary reduction gear driver rigidly attached to the engine input drive shaft;
   (b) a centrally bored reduction gear receiver rigidly attached to the initial crown plate, and connected in a driving relation to the reduction gear driver; wherein the gear driver rotates the reduction gear receiver and initial crown plate at a reduced rate.

5. A frictionless clutch comprising:
   (a) an initial crown plate which rotates about a central axis and has a central bore;
   (b) at least one unitary coupler, each coupler including:
      (i) a satellite pinion with which the initial crown plate is connected in a driving relation to produce a first stage rotary multiplication product;
      (ii) a beveled pinion transmitting gear; and
      (iii) a connecting shaft which at one end is rigidly connected to the satellite pinion and at another end is rigidly connected to the beveled pinion transmitting gear so that the coupler transmits the first stage rotary multiplication product;
   (c) two output receiving gears with which all the beveled pinion transmitting gears are connected in driving relation, both output receiving gears rotating about the central axis;
   (d) a circular retaining ring driver cog wheel including equidistantly spaced bearing supports for the couplers, the satellite pinion of each coupler being rotatably connected to the ring through a bearing support;
   (e) a central bearing block to which the beveled pinion transmitting gear of each coupler is rotatably mounted, and to which the two output receiving gears are rotatably mounted, wherein each coupler can rotate about an axis of its own, and the circular retaining ring, couplers and central bearing block are free to orbit concurrently about the central axis;
   (f) a secondary crown plate having a central bore, the secondary crown plate being rotatable around the central axis and being connected in a driving relation to the satellite pinions in mirror image relation to the initial crown plate;
   (g) a first cog wheel integrally connected to the secondary crown plate to rotate around the central axis, the first cog wheel having a central bore which is contiguous with the secondary crown plate bore;
   (h) a first shaft which is rigidly connected to the output receiving gear which is adjacent to the initial crown plate, the first shaft extending through and beyond the central bore of the initial crown plate such that the initial crown plate is free to rotate around the first shaft;
   (i) a second shaft which is rigidly connected to the output receiving gear which is adjacent to the secondary crown plate, the second shaft extending through and beyond the contiguous central bores of the secondary crown plate and first cog wheel such that the secondary crown plate and first cog wheel are free to rotate around the second shaft;
   (j) a rotating output drive shaft with an axis parallel to the central axis, and mounted to supporting framework;
   (k) a ring driver output receiving gear rigidly attached to the output drive shaft, and connected in a driving relation to the sustaining ring driver cog wheel;
   (l) a second cog wheel which is rigidly connected to the second shaft to rotate around the central axis;
   (m) a third cog wheel which is connected in a driving relation with the second cog wheel;
   (n) a fourth cog wheel which is connected in driving relation with the first cog wheel; and
   (o) a connecting axle which extends between the third and fourth cog wheels and which has ends which are rigidly connected to the third and fourth cog wheels, the connecting axle being parallel to the central axis and supportively mounted to a supporting framework; wherein the beveled pinion transmitting gears transmit to the output receiving gears a rotation output rate determined by the first stage rotary multiplication product, and the output receiving gear adjacent the secondary crown plate producing through the second shaft, the second and third cog wheels, the connecting axle, and the fourth and first cog wheels a second stage rotary multiplication product which establishes the rate of rotation of the secondary crown plate which in addition to the initial crown plate, drives the couplers through their satellite pinions, wherein concurrent crown plate counterrotation causes no rotation of the ring driver output receiving gear and attached output shaft, while progressive differential crown plate counterrotation causes progressive drive rotation of the output receiving gear and attached output shaft by the retaining ring driver cog wheel.

6. A frictionless clutch as claimed in claim 5 further comprising a sliding clutch mechanism including:
   (a) a clutch plate with a friction surface pad;
   (b) a centrally bored actuating drum keyed to one of two connecting axle sections and rigidly attached to the clutch plate to rotate with, and move laterally upon the axle section when actuated by the clutch actuating fork sliding within the rotating circular driving groove about the outer drum wall;
   (c) a clutch drive plate rigidly attached to the second connecting axle section; wherein the equal driving relationship between both axle shaft sections is uncoupled with loss of contact between the clutch plate friction pad surface and the clutch driven plate with free rotation of the second crown plate.

7. A steering drive system for a vehicle accepting motive power from a rotary drive shaft, mounted upon supporting framework, comprising:
   (a) a beveled driving pinion rigidly attached to a drive shaft, connected in a driving relation to a beveled driving gear rotating at a right angle axis to that of the drive shaft;
   (b) a drive shaft rigidly attached to the beveled driving gear with each shaft end freely rotating through centrally bored left and right ring gears, and rigidly connected to beveled side gears;

(c) a centrally bored steering clutch actuating drum keyed to rotate with the driver axle shaft and travel laterally upon the axle shaft when actuated by the steering clutch/lock brake actuator fork sliding within the rotating circular driving groove about the outer drum wall;

(d) a centrally bored right and left steering clutch plates with friction pad facing; the right plate rigidly attached to the right end of the steering clutch actuating drum, the left plate rigidly attached to the end of at least one clutch/drum connecting rod transiting through driving gear and rigidly attached to the left end of the steering clutch actuating drum; wherein the revolving steering clutch actuating drum and attached two clutch plates laterally move as one unit;

(e) a means for a centrally bored planetary reduction system attached to the inner side of each of the two ring gears, with an actuating driven disc attached to the inner side of each of the two planetary reduction means, wherein drive rotation from a steering clutch disc in contact with the planetary actuating driven disc rotates the disc to operate the planetary reduction means to rotate the ring gear in the same direction, but at a slower rate than the steering clutch disc and planetary actuating driven disc;

(f) a differential housing and mechanism mounted to each ring gear, comprising:
  (i) a spider gear shaft mounted to the housing at a right angle to the drive shaft;
  (ii) two spider gears rotatably mounted to the spider gear shaft and both connected in a driving relation to the side gear;
  (iii) an additional side gear rigidly attached to an output drive shaft rotatably mounted through the outer housing wall center, the second side gear connected in a driving relation to both spider gears; wherein non-turning vehicular drive occurs with equal concurrent rotation of both output drive shafts;

(g) a steering transfer gear rotating at a right angle to the driver axle shaft and rigidly connected to a support shaft rotatably mounted to supporting framework, the steering transfer gear connected in a driving relation to both ring gears; wherein planetary reduced driven motion rotating a ring gear and attached housing further rotates the steering transfer gear, counterrotating the second ring gear and differential housing to add rotational motion to one drive shaft while concurrently subtracting rotational motion from the second drive shaft.

8. A steering drive system as claimed in claim 7 further comprising a retractable steering transfer gear brake, including:
  (a) a steering lock brake shoe with a friction pad facing;
  (b) a bored shaft mount rigidly attached to supporting framework;
  (c) an actuation shaft moving through the mount, and rigidly attached on one end to the brake shoe;
  (d) a spring stop/actuation point rigidly attached to the second end of the actuation shaft;
  (e) a coiled actuation spring exerting pressure between the spring stop/actuation point and the shaft mount; wherein the steering lock brake remains retracted until driven by the steering clutch/lock brake actuator fork to pressure contact with, and preventing rotation of the steering transfer gear.

9. The steering drive as claimed in claim 7 with an auxiliary steering motor, comprising:
  (a) an auxiliary motor with a rotating output drive shaft, the motor rigidly attached to supporting framework, the drive shaft parallel to the steering axle axis of rotation;
  (b) a worm wheel rigidly attached to the steering transfer gear;
  (c) a worm gear rigidly connected to the auxiliary motor drive shaft, and further connected in a driving relation to the worm wheel; wherein the auxiliary motor rotates the steering drive gear to counterrotate the two ring gears.

10. The steering drive system of claim 7 with an auxiliary steering motor comprising:
  (a) an auxiliary motor with a rotating output drive shaft, the motor rigidly attached to supporting framework, the drive shaft positioned at a right angle to the axle axis of rotation;
  (b) a combination worm driven and steering drive ring gear connected in a driving relation to the steering transfer gear;
  (c) a worm gear rigidly connected to the auxiliary motor drive shaft, and further connected in a driving relation to the combination worm drive and steering drive ring gear; wherein the auxiliary motor rotates the combination gear to rotate the steering transfer gear to counterrotate a ring gear.

* * * * *